›UNITED STATES PATENT OFFICE.

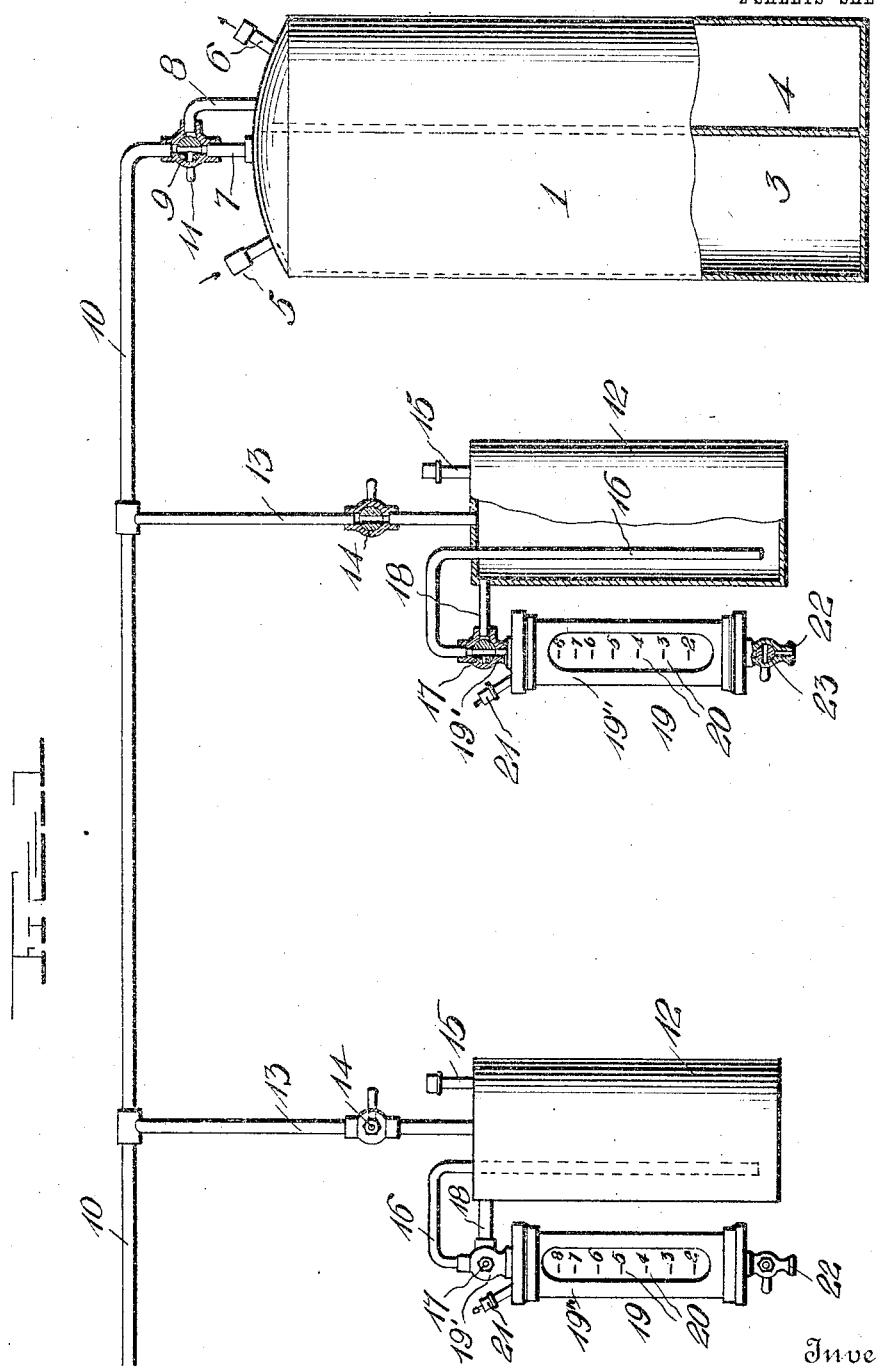

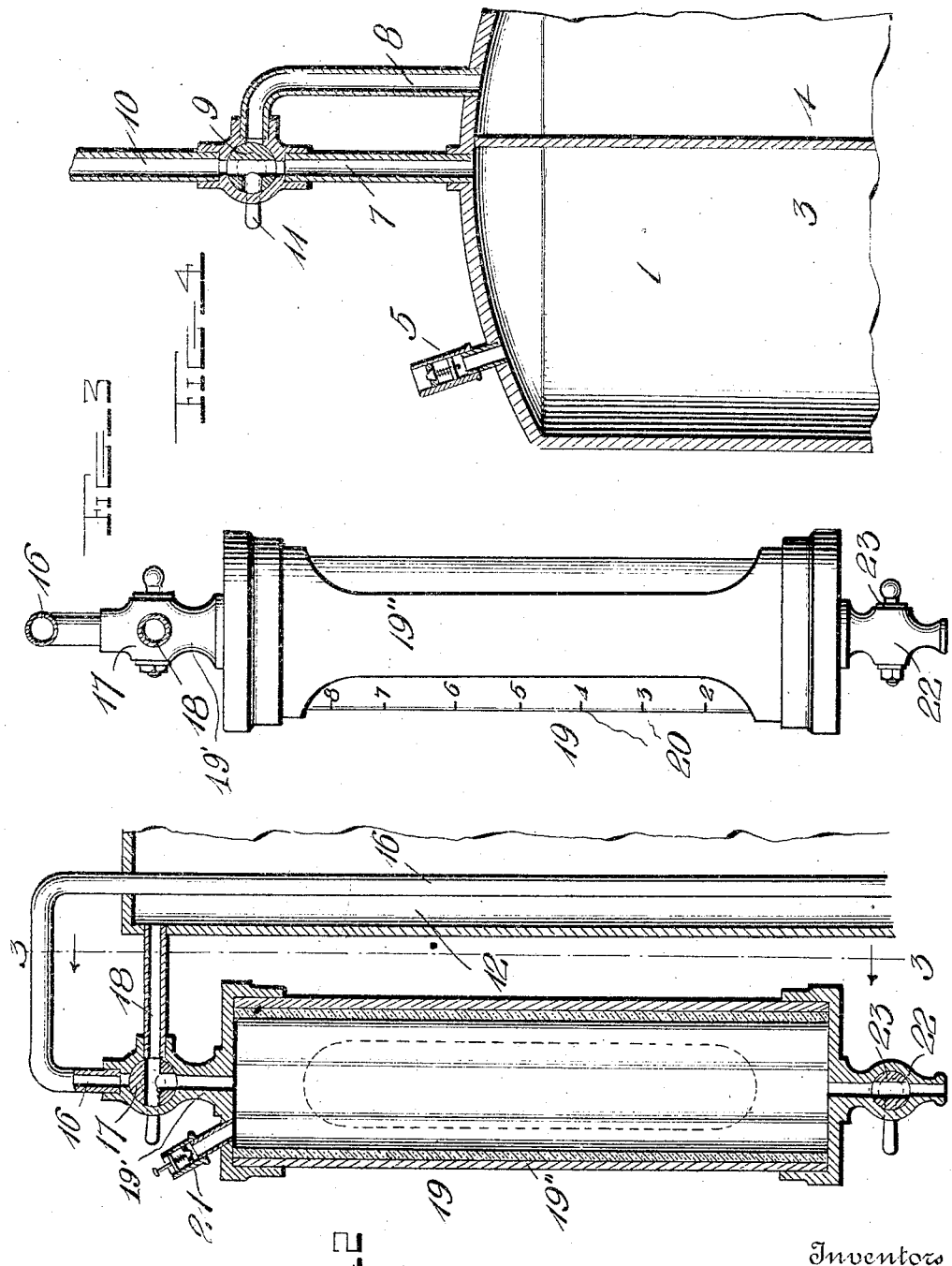

GEORGE W. R. CULBERTSON AND SYLVANUS R. CLARK, OF GLEZEN, INDIANA.

LIQUID MEASURING AND FILLING APPARATUS.

969,090.

Specification of Letters Patent. Patented Aug. 30, 1910.

Application filed September 9, 1909. Serial No. 516,867.

*To all whom it may concern:*

Be it known that we, GEORGE W. R. CULBERTSON and SYLVANUS R. CLARK, citizens of the United States, residing at Glezen, in the county of Pike and State of Indiana, have invented certain new and useful Improvements in Liquid Measuring and Filling Apparatus; and we do declare the following to be a full, clear, and exact description of the invention, such as will enable others skilled in the art to which it appertains to make and use the same.

This invention relates to an apparatus for filling a receptacle with any desired quantity of liquid or for discharging the liquid contained in said receptacle.

Another object of the invention is to provide an apparatus having means for measuring the liquid in its passage either to or from a receptacle.

With the foregoing and other objects in view, the invention consists of certain novel features of construction, combination and arrangement of parts as will be more fully described and particularly pointed out in the appended claims.

In the accompanying drawings, Figure 1 is a side elevation of this improved apparatus with the valve at the upper end of the measuring vessel shown in section and in position to afford communication between said vessel and the siphon pipe; Fig. 2 is a longitudinal section of the measuring vessel, showing the valves in position for communication with the tank; Fig. 3 is a vertical sectional view taken on line 3—3 of Fig. 2; Fig. 4 is a fragmentary vertical sectional view of a portion of the main tank.

In the embodiment illustrated, a tank 1 is shown having an upright partition arranged therein to form two compartments 3 and 4, having valves 5 and 6 arranged at the upper ends thereof which are adapted to be connected with a pump for a purpose to be described. The compartment 3 is preferably designed as a compressed air reservoir, being supplied with the compressed air through the valve 5, and having an outlet pipe 7 at its upper end for a purpose to be described. The compartment 4 is designed as a vacuum chamber, air being exhausted therefrom through the valve 6 at its upper end, and a pipe 8 connects the upper end of the chamber 4 with the pipe 7, a three-way valve 9 being arranged at the junction of said pipes with a conducting pipe 10. This valve 9 is provided with an operating handle 11 for turning it into position to connect the pipe 10 with either the pipe 7 or 8, as may be desired.

A receptacle 12 is connected by a pipe 13 with the pipe 10, said pipe 13 being preferably provided with a stop cock or valve 14 operable for connecting the pipe 10 with the receptacle 12 or for cutting off communication therewith as desired. A tube 15 projects from the upper end of the receptacle 12 and is preferably provided with a cap for closing it. A goose-neck or siphon pipe 16 has the long arm thereof extending into the receptacle 12, and the free end of its short arm is connected with a tube 19′ at the upper end of a measuring vessel 19, said tube 19′ having a three-way valve 17 arranged therein. A pipe 18 is connected at one end with the upper end of the receptacle 12 and at its other end with the valved tube 19′ of the measuring vessel 19, said pipe 18 being adapted to afford communication between the receptacle and measuring vessel when the three-way valve 17 is turned in to the position shown in Fig. 2, the turning of the valve in this position cutting off communication with the short arm of the pipe 16.

The measuring vessel 19 which is connected at its upper end with the valved tube 19′ is preferably composed of a cylindrical glass vessel mounted in a casing 19″ preferably constructed of metal and which may be of any suitable or desired shape. A scale 20 is arranged on one side of the vessel 19 to indicate the amount of liquid contained in said vessel, said scale being exposed through an opening in the casing 19″. A vent valve 21 is also connected with the upper end of the measuring vessel 19 and is preferably constructed as shown in Fig. 2. The lower end of the vessel 19 is provided with a tube 22 having a stop cock 23 arranged therein.

In the operation of this apparatus, when it is desired to fill the receptacle 12 with liquid from any suitable source of supply, the tube 22 of the measuring vessel is connected with a pipe extending to the supply and the valve 23 is opened and valve 17 is turned to cut off communication with pipe 18 and to afford communication between tube 19′ and pipe 16, and the valves 14 and 9 are positioned to afford communication between the vacuum chamber 4 and the receptacle 12, whereby the liquid is sucked from the storage tank or other source of supply through the measuring vessel into the receptacle 12, until the desired amount has been drawn thereinto. The valves 14 and 23 are then closed, and the corresponding valve 14 in the adjacent receptacle 12 is opened and the operation is repeated for filling said second receptacle, it being understood that any desired number of receptacles may be connected with the pipe 10, by means of valved branch pipes. When it is desired to discharge the contents of the receptacle 12, the valve 9 is turned to cut off chamber 4 and bring compressed air chamber 3 into communication with pipes 10 and 13. The valves 14 and 23 are opened and the valve 17 remains in the position shown in Fig. 1, and the compressed air from the compartment 3 drives the liquid out of the receptacle 12 through the pipe 16 and measuring vessel 19 into a suitable storage or other vessel. When it is desired to draw, say, one pint of liquid, the valve 23 is closed, and the liquid is allowed to flow into the vessel 19 until it reaches the predetermined point and the valve 17 is turned to cut off pipe 16 from tube 19′ and connect pipe 18 and the compressed air then passes through the pipe 18 into the vessel 19 and on opening valve 23 drives out all the liquid from said vessel 19.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described our invention, what we claim is:—

1. In an apparatus of the class described, the combination of a vacuum chamber, a compressed air chamber, a receptacle having a valved pipe opening thereinto, valved means for connecting said pipe with said vacuum chamber and said compressed air chamber respectively, a graduated measuring vessel, a tube at the upper end of said vessel having a three-way valve arranged therein, a siphon pipe having its long leg extending into said receptacle and its short leg connected with said three-way valve, a valved pipe leading from the lower end of said vessel, and another pipe connected with said receptacle and with said three-way valve.

2. In an apparatus of the class described, the combination of a vacuum chamber, a compressed air chamber, a receptacle, a pipe extending into said receptacle, another pipe discharging into said receptacle, means connected with said last mentioned pipe and with said compressed air and vacuum chambers, a measuring vessel having valved tubes at its opposite ends, said first mentioned pipe being connected with the valved tube at the upper end of said vessel, and a pipe connecting said last mentioned valved tube with said receptacle.

In testimony whereof we have hereunto set our hands in presence of two subscribing witnesses.

GEORGE W. R. CULBERTSON.
SYLVANUS R. CLARK.

Witnesses:
   Geo. W. Deffendall,
   C. P. Carr.